Sept. 29, 1970  H. R. G. DUNHAM ET AL  3,530,590
PAINT PROPORTIONING APPARATUS
Filed Nov. 13, 1967  3 Sheets-Sheet 2
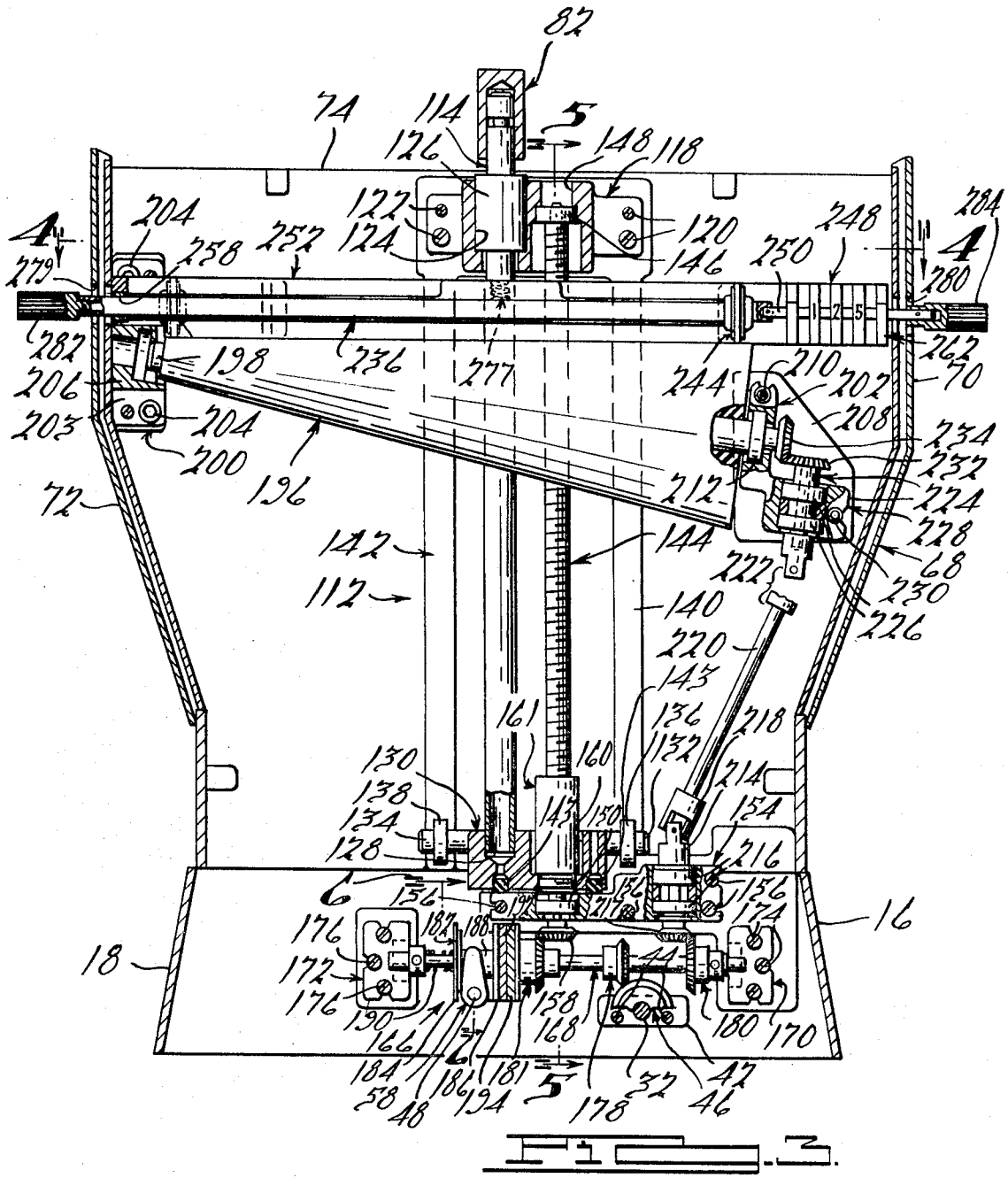
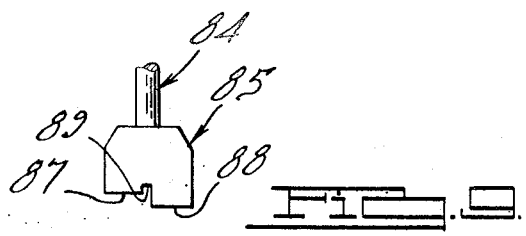
INVENTORS
Homer R. G. Dunham,
BY Gerald F. Lewis
Harness, Dickey & Pierce
ATTORNEYS

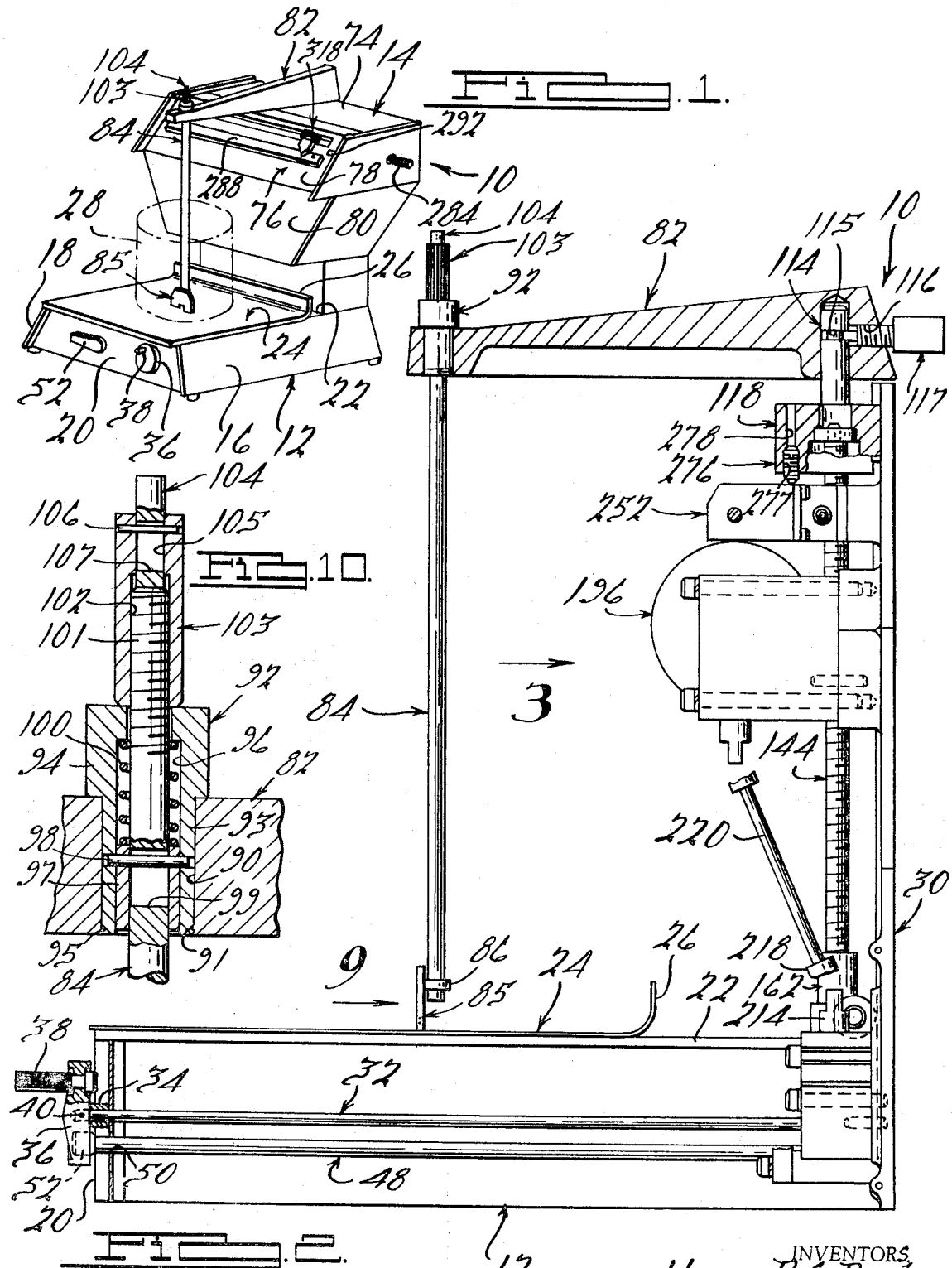

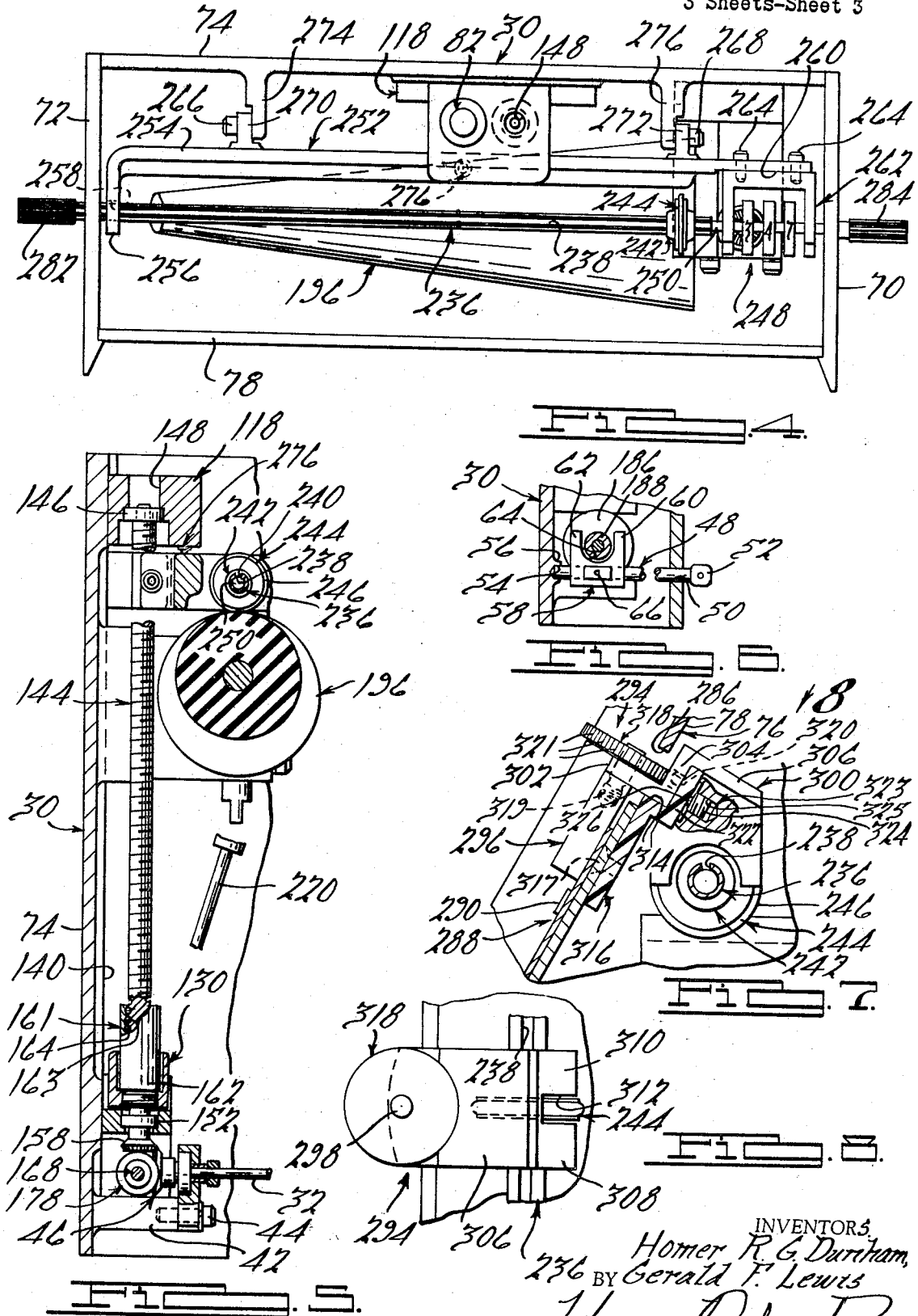

United States Patent Office 3,530,590
Patented Sept. 29, 1970

3,530,590
PAINT PROPORTIONING APPARATUS
Homer R. G. Dunham, Royal Oak, and Gerald F. Lewis, Berkley, Mich., assignors to Interchemical Corporation, New York, N.Y., a corporation of Ohio
Filed Nov. 13, 1967, Ser. No. 682,341
Int. Cl. G01f 23/04
U.S. Cl. 33—126.7
26 Claims

ABSTRACT OF THE DISCLOSURE

A paint proportioning apparatus comprising a base structure adapted to support a receptacle for receiving proportionate quantities of paint constituents; a vertically disposed probe element adapted to have the lower end thereof inserted within a receptacle mounted on the base structure; means for effecting vertical adjustable movement of the probe element; counter means for indicating the amount of movement of the probe element; means for simultaneously actuating the counter means and the means for effectiing vertical movement of the probe element, and means for varying the ratio of movement of the probe element to the rate of actuation of the counter means.

BACKGROUND OF THE INVENTION

Although there has been a wide variety of so-called paint proportioning devices known in the prior art, which, for example, have been used primarily in mixing base color paints and/or pigments for producing paints of specific color shades, such heretofore known and used proportioning devices have generally been objectionable due to their inability to utilize a single relatively uncomplicated ingredient counting mechanism for measuring the amounts of paint constituents proportioned into containers of different sizes or total volumes. That is, the various paint proportioning devices heretofore known have required separate ingredient quantity counting devices, or at best, single counters having complicated gear transmissions for measuring paint ingredients proportioned into each of a plurality of different size containers, such as pint, ½ gallon or 1 gallon containers. Accordingly, such paint proportioning devices have been extremely limited in use and thus undesirable due to the fact that they have been unable to proportion paint ingredients into more than one size containers, and those proportioning devices which have been capable of proportioning paint constituents into two, three or more different size containers have been objectionable due to their extremely complex design and operation, resulting from the unnecessary duplication of mechanical linkages, gears, electronics and the like, required for the counting and measuring or proportioning of ingredients into each of several different size containers.

Generally speaking, the paint proportioning apparatus of the present invention is designed to obviate the above mentioned problems through the provision of a noval construction which enables a single paint constituent counting device of an extremely simple design to be used in counting the proportional quantities of paint constituents proportioned into virtually all size containers, with the result that the apparatus of the present invention will find universality of application. By way of example, the proportioning apparatus of the present invention can be set for proportioning ingredients into containers based on the imperial measuring system used in Canada, into containers based on the metric measuring system used in Europe, as well as into containers based on the English measuring system as used in the United States.

In operation of the paint proportioning apparatus of the present invention, a receptacle of constant horizontal cross-sectional area of any suitable size is placed upon a support provided on the machine. A verically disposed probe element is moved downwardly into the receptacle to a position wherein the lower end thereof touches the bottom of the receptacle. A proportionate counting mechanism is then set at zero (000) and the probe is raised a predetermined distance from the bottom of the receptacle, the specific distance being proportional to the amount of the first colorant or ingredient which is to be poured into the receptacle. The first colorant or ingredient is then poured into the receptacle until the surface level thereof touches the lower end of the probe element, at which time the operator is then apprised that he has poured enough of the particular liquid into the receptacle. Thereafter, the probe is moved upwardly to a position wherein the lower end thereof is spaced above the level of the first ingredient a distance proportional to the amount of the second ingredient which is to be added to the receptacle and the second ingredient is added. This process is continued until all of the colorants and ingredients have been poured into the receptacle in their proper respective amounts.

The upper end of the probe element is connected to a helical screw arrangement, rotation of which results in the probe moving vertically relative to the receptacle, as above described. The amount of vertical movement of the probe element is indicated to the operator by means of a counter mechanism which is proportioned in suitable units, for example, in units of 1000. The counter mechanism incorporates a friction drive system having a drive means that is drivingly connected to a tapered roller member. This member is in turn operatively connected through a shaft and beveled gear arrangement with the aforementioned screw mechanism. Thus, the drive means causes threading of the screw, which in turn results in vertical movement of the probe element. An idler roller member is mounted adjacent the tapered roller member and is adapted to be frictionally engaged therewith, the idler roller being mounted on a shaft, rotation of which effects actuation of the counter mechanism. The idler roller is adapted to be moved longitudinally along the aforesaid shaft, whereby to infinitely vary the ratio of the rate of actuation of the counter mechanism to the amount of vertical movement of the probe element. The desired ratio can be preset by moving the idler roller to a preselected position with respect to the tapered roller element, and means in the form of a fixed scale having indicia markings is placed on the apparatus for indicating the various settings for the idler roller.

One particularly important feature of the paint proportioning apparatus of the present invention resides in the fact that the probe element thereof may be reset or placed in its zero position merely by means of pressing an actuating lever on the forward side of the apparatus. Such a feature is achieved by having the probe element operatively supported by means of a ball screw mechanism that is threadably engaged with a vertically extending screw member. By virtue of the extremely low frictional characteristics of the ball screw mechanism, upon disengaging an associated clutch assembly, the screw member is free to rotate, whereby the ball screw mechanism, as well as the probe and support arm therefor, is free to drop solely under the influence of gravity to a position wherein the lower end of the probe element is properly positioned preparatory to the next operational cycle. This construction entirely obviates the need for manually resetting the probe element after each cycle, thereby considerably minimizing the effort required to operate the apparatus of the present invention.

SUMMARY OF THE INVENTION

This invention relates generally to proportional mixing devices and, more particularly, to a new and improved apparatus for measuring the ingredients and color constituents of different colored paints, lacquers, enamels, inks and similar coating materials.

It is accordingly, a general object of the present invention to provide a new and improved apparatus for proportioning paint constituents which utilizes a single common constituent quantity counting device for measuring the amounts of paint constituents proportional into each of an infinite number of containers of different sizes or total volumes.

It is a more particular object of the present invention to provide a new and improved paint proportioning apparatus of the above character which utilizes a novel friction drive system incorporating a tapered roller drive mechanism that is operatively connected to a unit quantity counter device.

It is another object of the present invention to provide a new and improved paint proportioning apparatus which includes means for resetting the initial position of the probe element by merely pressing a lever or button, hereby eliminating the need for resetting the probe element as by cranking or a similar manipulation.

It is another object of this invention to provide a new and improved paint proportioning apparatus of the above character which may be easily adjusted, whereby to provide for rapid and effortless operation.

It is still another object of the present invention to provide a paint proportioning apparatus of the above character which is of a durable construction and will therefore have a long and effective operational life.

Other objects and advantages of the present invention will become apparent from the following detailed description, taken in conjunction with the accompanying drawings.

BRIEF DESCRIPTION OF THE DRAWINGS

FIG. 1 is an elevated perspective view of a preferred embodiment of the paint proportioning apparatus of the present invention;

FIG. 2 is an enlarged longitudinal cross sectional view of the paint proportioning apparatus illustrated in FIG. 1;

FIG. 3 is a longitudinal cross sectional view of the structure illustrated in FIG. 2, as taken substantially in the direction of the arrow 3 thereof;

FIG. 4 is a cross sectional view taken substantially along the line 4—4 of FIG. 3;

FIG. 5 is a fragmentary cross sectional view taken substantially along the line 5—5 of FIG. 3;

FIG. 6 is a fragmentary cross sectional view taken substantially along the line 6—6 of FIG. 3;

FIG. 7 is a side elevational view of the adjustment pointer mechanism of the present invention;

FIG. 8 is an elevated perspective view taken in the direction of the arrow 8 in FIG. 7;

FIG. 9 is a side elevational view of a portion of the structure shown in FIG. 2, as seen in the direction of the arrow 9 thereof, and FIG. 10 is a longitudinal cross sectional view of the vernier probe adjustment portion of the apparatus of the present invention.

DESCRIPTION OF A PREFERRED EMBODIMENT

For purposes of description, the term "paint" will be used herein in a broad sense to cover any coating material including paint per se, varnish, shellac, lacquer, enamel, ink and the like. Also, the terms "forwardly" and "rearwardly" will have reference to the left and right sides, respectively, of the apparatus as shown in FIG. 2, while the terms "inwardly" and "outwardly" and derivatives thereof will have reference to the geometric center of the apparatus of the present invention and the various component parts thereof.

Referring now to the drawings, a paint proportioning apparatus 10, in accordance with a preferred embodiment of the present invention, is shown as generally comprising a base or support section 12 having a proportioning and constituent counting section, generally designated 14, extending upwardly from the rearward side thereof. As best shown in FIG. 1, the base section 12 comprises downwardly and outwardly inclined side portions 16 and 18, a forward side portion 20 and an upper, generally horizontally disposed support portion 22. Mounted on the upper side of the support portion 22 is a receptacle positioning plate 24 having a vertically extending rearward flange portion 26 formed thereon and adapted to have suitable receptacles or the like, one of which is shown in phantom lines in FIG. 1 and designated by the numeral 28. The flange portion 26 is adapted to function in preventing dirt and the like from dropping from down behind the plate 24, and the relatively arcuate portion of the flange 26 facilitates cleaning thereof. Also, the above described construction of the plate 24 functions, at least in part, to enhance the appearance of the apparatus 10. Generally speaking, the section 14 comprises means for effecting vertical adjustable movement of a vertically disposed probe element, whereby the probe element may be selectively adjusted within the receptacle 28 to indicate the quantity of paint colorants and ingredients which are to be proportioned into the receptacle, as will hereinafter be described.

Referring now in detail to the base section 12 of the apparatus 10, as best seen in FIGS. 1 and 2, the section 12 is closed at the rearward side thereof by a generally vertically extending cover plate 30 which also functions to enclose the rearward side of the section 14. Extending rearwardly between the forward side portion 20 and the cover plate 30 is an elongated cylindrical crankshaft 32 which is rotatably mounted at the forward end thereof by suitable bushing means 34 mounted in the side portion 20. The forward end of the crankshaft 32 is provided with a suitable crank member 36 having a manually engageable knob 38 affixed thereto, the crank 36 being fixedly connected to the crankshaft 32 by means of a suitable locking pin, set screw or the like 40. The rearward end of the crankshaft 32 is rotatably supported by means of a suitable bearing block 42 which is fixedly secured to the cover plate 30 by suitable screws, bolts or the like 44. As illustrated in FIG. 3, the rearward end of the crankshaft 32 is provided with a beveled gear member 46 which is adapted to drivingly connect the crankshaft 32 with the counting and proportioning mechanism contained within the section 14 of the apparatus 10, as will later be described.

Disposed laterally of the crankshaft 32 and extending substantially parallel thereto between the forward side portion 20 and the cover plate 30 is a clutch actuating shaft 48 that extends forward through a suitable opening 50 in the forward side portion 20 and is provided with a suitable actuating lever or knob 52, as best seen in FIG. 1. The rearward end portion of the clutch actuating shaft 48 is rotatably mounted within a suitable bore 54 defined by a forwardly extending embossed portion 56 formed on the inner side of the cover plate 30, as best seen in FIG. 6, whereupon proper pivotal movement of the knob 52 will effect rotational movement of the shaft 48, as will be apparent. The clutch actuating shaft 48 is adapted to carry a generally U-shaped or bifurcated yoke member 58 on the rearward end thereof adjacent the cover plate 30, which member 58 is provided with upwardly extending arm sections 60 and 62 that define a generally semicircular recess 64 therebetween, as shown in FIG. 6. The yoke member 58 is fixedly secured to the actuating shaft by suitable locking pin or set screw 66, whereby proper rotational movement of the knob 52 and shaft 48 will effect pivotal movement of the member 58 in a manner later to be described.

Referring now to the proportioning and constituent counting section 14 of the apparatus 10, as best illustrated in FIGS. 1 through 3, the section 14 comprises an exterior closure or housing, geenrally designated 68, which comprises side wall sections 70, 72, an upper wall portion 74, and a front or forward wall section 76 comprising upper and lower portions 78 and 80, respectively. As previously mentioned, the rearward side of the section 14 is enclosed by the cover plate 30. Extending forwardly from a central portion of the upper end of the housing 68 is an elongated probe element support arm, generally designated 82, the forwardmost end portion of which terminates at a position substantially vertically aligned with the center of the positioning plate 24. The support arm 82 is adapted to operatively support a generally elongated cylindrical, vertically disposed proble element 84. The lower end of the probe element 84 is provided with an indicating toe member, generally designated 85, adjustably secured to the lower end thereof. As best shown in FIG. 2, the rearward side of the toe member 85 is provided with an annular clip 86 which is designed to detachably secure the toe member 85 to the lower end of the probe element 84 in the manner so as to enable the member 85 to be pivoted about the longitudinal axis of the probe element 84. In a preferred construction of the present invention, and as best shown in FIG. 9, the toe 85 comprises a pair of vertically spaced, horizontally extending indicating edge portions 87 and 88, the portions 87, 88 being separated by an upwardly extending recessed portion 89. In operation of the paint proportioning apparatus of the present invention, the lower indicating portion 88 is adapted to function as an advanced warning to the operator, while the upper portion 87 functions to tell the operator that the paint proportionate which is being poured into the receptacle has reached the desired height indicated on the associated proportionate counting mechanism, hereinafter to be described. Thus, the operator pours a constituent into the receptacle and when the level of the constituent reaches the lower edge portion 88, the operator knows that only a small additional quantity of constituent must be poured into the receptacle before the desired proportionate volume has been added thereto. The recessed portion 89 is adapted to function in preventing the paint constituents from flowing, as by capillary action, from the edge portion 88 to the edge portion 87, thereby obviating the possibility of the operator being informed prematurely of the constituent level within the receptacle.

The forward end of the support arm 82 is formed with a vertically extending bore 90 which is formed with a single helical thread 91 at the lower end thereof. The upper end of the probe element 84 is adapted to be supported for vertical adjustable movement within the bore 90 by means of an annular locking member 92 which comprises a cylindrical lower section 93 adapted to be received within the bore 90. The upper end of the member 92 is formed with an enlarged diameter manually engageable portion 94. The lowermost portion of the section 93 is formed with a single thread 95 adapted to threadably engage the thread 91 in the bore 90, whereby proper insertion and rotation of the locking member 92 will result in the threads 95 and 91 being lockingly engaged with one another, thus securing the member 92 to the support arm 82. Upon rotation of the member 92 a single revolution, the threads 91 and 95 will be disengaged in order to permit the locking member 92, as well as the probe element 84, to be moved upwardly with respect to the arm 82.

The locking member 92 is formed with a centrally axially extending bore 96, the lower end of which is provided with a bushing 97 adapted to slidably support the probe element 84. A transversely extending retaining pin 98 extends through the bushing 97, and an elongated slot 99 is formed in the upper end of the probe element 84. The outer ends of the pin 98 are retained within the locking member 92, whereby the pin 98 functions to limit vertical movement of the probe element 84 to a distance equal to the height of the slot. A helical coil spring 100 is disposed within the bore 96 directly above the bushing 97 and is adapted to exert a downwardly directed force against the top of the bushing 97 so as to resist upward movement of the probe element 84.

The upper end of the probe element 84 is formed with an externally threaded portion 101 that is adapted to be threadably received within an annular bore 102 of a generally cylindrically shaped, vernier adjustment knob 103 located directly above the locking member 92. It will be seen that upon proper rotation of the knob 103, the probe element 84 will be raised or lowered a predetermined amount relative to the support arm 82, thereby providing for fine vertical adjustment of the element 84. An indicator pin 104 is slidably mounted within an axially extending reduced diameter bore 105 of the adjustment knob 103, the pin being retained within the knob 103 by means of a suitable transversely extending locking member 106 which projects through an elongated central slot 107 formed in the pin 104. In operation of the apparatus 10, the indicating pin 104 is adapted to provide a visual indication of the amount of adjustment which may be made by the vernier knob 103, as well as an indication of the direction in which the probe 84 may be adjusted. For example, if the pin 104 is in the position indicated in FIG. 10, the operator will know that the probe element 84 has been lowered to the fullest extent and thus can only be adjusted upwardly upon proper rotation of the knob 103.

The probe element 84, along with the support arm 82, is adapted to be selectively vertically adjusted with respect to the upper surface of the plate 24 and any receptacle, such as the receptacle 28, mounted thereon. Means for effectuating such vertical adjustable movement of the probe element 84 is provided by an elevating assembly, generally designated 112, mounted adjacent the inner side of the cover plate 30 and adapted to be selectively connected to the crankshaft 32, whereby proper rotational movement of the shaft 32 will result in raising and lowering of the probe element 84. More particularly and as best seen in FIG. 3, the elevating assembly 112 comprises a generally vertically extending elevating shaft 114, the upper end of which is formed with an annular recess 115 and is received within a vertically extending bore 116 formed in the lower side of the rearward end of the support arm 82. A manually adjustable locking member 117 is threadably mounted in the rearward end of the arm 82 and is adapted to be selectively tightened and loosened so as to permit the arm 82 and probe 84 to be pivoted about the longitudinal axis of the shaft 114 and thereafter lockingly secured to the shaft 114 at any preselected position. The upper end of the shaft 114 is supported for vertical reciprocable movement by means of a suitable bearing block 118 fixedly secured to the inner side of the cover plate 30 by suitable screws, bolts or the like 120 and 122. The block 118 is provided with a vertically extending bore 124 which carries anti-friction bushing means 126 adapted to slidably support the shaft 114. The lower end of the elevating shaft 114 is adapted to be fixedly secured within a suitable annular recess 128 formed in the upper end of a generally horizontally disposed transfer member 130. The member 130 is provided with laterally outwardly extending lower support sections 132 and 134 that rotatably supports a pair of annular roller members 136 and 138 which are adapted to ride upon a pair of spaced parallel, vertically extending trackways 140 and 142, respectively, formed on the forward side of the cover plate 30. It will be seen that as the transfer member 130 thus moves upwardly within the housing 68, the elevating shaft 114 will be moved vertically upwardly, with the result that the support arm 82 and probe element 84 will move upwardly in a similar manner. Likewise, downward movement of the transfer member 130 will effect movement in a downward direction of the shaft 114, support arm 82 and probe element 84. As best seen in FIG. 3, the lower end of the transfer member 130 is provided with a pair of resilient bumpers 143 which are preferably fabricated of rubber and are adapted to engage the upper side of a bearing block, later to be described, upon downward movement of the transfer member 130, thus serving as a cushioning means for the member 130.

Means for effecting upward and downward movement of the transfer member 130 is provided by a helical screw member, generally designated 144, which extends vertically within the housing 68 at a position spaced laterally from the elevating shaft 114. The member 114 is provided with an exterior helical thread and is rotatably supported at the upper end thereof by means of a suitable bushing member 146 within an annular bore 148 formed in the bearing block 118. The lower end of the screw member 144 is rotatably supported by means of a suitable bearing or bushing 150 which is operatively secured to the cover plate 30 by means of a bearing block, generally designated 154, that is secured to the plate 30 by suitable screws, bolts or the like 156. The lower end of the screw member 144 is provided with a bevel gear member 158 that is adapted to be drivingly connected through a drive assembly, later to be described, to the crankshaft 32, whereby rotation of the shaft 32 will effect simultaneous rotation of the screw member 144.

The transfer member 130 is provided with an annular bore 160 which is adapted to rotatably carry an annular ball screw mechanism, generally designated by the numeral 161. The mechanism 161 is of a construction well known in the art and comprises an annular housing 162 defining a series of helically arranged grooves 163 within which a plurality of spherical bearings 164 are retained. The bearings 164 are adapted to ride within the threads of the helical screw member 144, whereby rotation of the screw member 144 will result in vertical upward or downward movement of the mechanism 161 along the screw member 144. By virtue of the fact that the mechanism is fixedly, yet rotatably, secured to the tranfer member 130, vertical movement of the mechanism 161 along the screw member 144 will result in simultaneous movement of the transfer member 130, elevating shaft 114, support arm 82 and probe element 84. As will be readily apparent to those skilled in the art, the ball screw mechanism 161 is characterized by having extremely low frictional resistance to moving longitudinally of the screw member 144. Accordingly, at such time as the member 144 is free to rotate about its longitudinal axis, by means of the clutch assembly later to be described, the mechanism 161, as well as the transfer member 130 and shaft 114 is adapted to move downwardly relative to the screw member solely under the influence of gravity. Thus, the probe element 84 may be returned to its zero (lower) position without requiring any reverse rotational adjustment of the knob 38, crank 36 and crankshaft 32.

As best illustrated in FIG. 3, the paint proportioning apparatus 10 of the present invention incorporates a drive assembly, generally designated 166, which is adapted to drivingly connect the crankshaft 32 with the elevating assembly 112 and the paint proportioning counter mechanism later to be described. The drive assembly 166 comprises a generally horizontally disposed drive shaft 168 which is rotatably supported adjacent the cover plate 30 by means of a pair of laterally spaced bearing support blocks 170 and 172 which are attached to the cover plate 30 by means of suitable screws, bolts or the like 174 and 176, respectively. The drive shaft 168 is provided with a bevel gear member 178 at an intermediate portion thereof, which gear member 178 is adapted to meshingly engage the gear member 46 on the rearward end of the crankshaft 32, whereby rotation of the crankshaft 32 will result in simultaneous rotation of the drive shaft 168. The shaft 168 is provided with a pair of additional beveled gear members 180 and 181, the latter of which is adapted to meshingly engage the gear member 158 disposed on the lower end of the screw member 144, with the result that rotation of the drive shaft 168 will effect simultaneous rotation of the screw member 144. The beveled gear member 180 is adapted to be drivingly connected to an actuating mechanism later to be described for rotating the aforementioned counting mechanism.

Slidably mounted on the drive shaft 168 adjacent the bearing block 172 is an annular spool member 182 having a pair of radially extending flange sections 184 and 186 and a central cylindrical section 188 disposed coaxially of the shaft 168. As shown in FIG. 6, the central cylindrical section 188 of the spool member 182 is adapted to be received within the recess 64 of the yoke member 58, whereby pivotal movement of the yoke member 58 in a counterclockwise direction in FIG. 3 will result in the spool member 182 being moved axially of the shaft 168 toward the bearing block 172, and similarly, pivotal movement of the yoke member 58 in a clockwise direction will result in the spool member 182 being moved axially of the shaft 168 away from the bearing block 172. The spool member 182 is spring biased axially of the shaft 168 away from the bearing block 172 by means of a suitable coil spring or the like 190 which extends circumjacent the shaft 168 between the bearing block 172 and the flange section 184 of the spool member 182. The flange section 186 of the spool member 182 is provided with an annular friction or clutch plate 192 which is adapted to frictionally engage a similar type plate 194 mounted on the laterally outboard side of the bevel gear member 181. The clutch plate 192 is adapted to be biased into frictional engagement with the plate 194 by means of the spring 190, which spring thereby exerts a force resisting relatively free rotation of the drive shaft 168. At such time as the clutch actuating shaft 48 is rotated in a counterclockwise direction in FIG. 3, the yoke member 58 will bias the spool member 182 axially away from the beveled gear member 181, with the result that the clutch plate 192 will move out of engagement with the plate 194. When the clutch plates 192, 194 are thus disengaged, the screw member 144 is adapted to freely rotate by virtue of the fact that the beveled gear member 158 is not drivingly engaged with the shaft 168. Accordingly, the ball screw mechanism 161 is free to move downwardly along the screw member 144 solely under the influence of gravity and thereby properly position the probe element 84 preparatory to the next successive operational cycle, as will hereinafter be described in detail. At such time as the clutch actuating shaft 48 is rotated in a clockwise direction in FIG. 3, the yoke member 58 and spool member 182 be biased to the position shown in FIG. 3, thereby engaging the clutch plate 192 with the plate 194 to yieldably resist further rotational movement of the shaft 168.

Referring now to FIG. 3, mounted centrally of the housing 68 is a generally tapered roller member 196 which is preferably fabricated of neoprene or a similar slightly resilient material and is fixedly secured to an elongated cylindrical shaft 198 extending coaxially thereof. The shaft 198 is operatively mounted within the housing 68 such that the upper edge of the tapered roller member 196 lies along a generally horizontal plane, with the result that a pair of bearing blocks 200 and 202 which function to rotatably support the shaft 198 and roller member 196 are mounted within the housing 68 such that the bearing block 202 is oriented slightly below the bearing block 200. More particularly, the bearing block 200 is rigidly secured to the cover plate 30 by means of a mounting bracket 203 and suitable screws, bolts or the like 204 at a position slightly below the upper end of housing 68, the block 200 being provided with a suitable downwardly and inwardly inclined antifriction bushing or bearing member 206 adapted to rotatably support one end of the shaft 198. The opposite end of the shaft 198 is rotatably supported by means of the bearing block 202 which is located slightly below the block 200 and is fixedly secured to the cover plate 30 by means of a suitable mounting bracket 208 and screws, bolts or the like 210. As shown in FIG. 3, the end of the shaft 198 supported within the bearing block 202 is provided with suitable anti-friction bearing or bushing means 212.

The tapered roller member 196 and the shaft 198 are adapted to be drivingly connected to the drive shaft 168 by means of an upwardly extending shaft member 214 that is rotatably mounted within the bearing block 154 by means of a suitable bearing or bushing 216. The lower end of the shaft 214 is provided with a bevel gear member 217 that is adapted to meshingly engage the gear member 180 on the shaft 168, with the result that rotation of the shaft 168 will cause simultaneous rotation of the shaft 214. The upper end of the shaft 214 is connected by means of a suitable universal joint assembly 218 to an upwardly and forwardly inclined shaft 220 that is drivingly connected at the upper end thereof through another universal joint assembly 222 to a shaft 224 rotatably mounted by means of suitable bearing or bushing means 226 in a bearing block 228. The bearing block 228 is operatively mounted on the bracket 208 adjacent the bearing block 202 by means of suitable screws, bolts or the like 230. The upper end of the shaft is provided with a bevel gear member 232 which is adapted to meshingly engage an associated gear member 234 fixedly secured to the adjacent end of the shaft 198, with the result that rotation of the shafts 220 and 224 will effect rotation of the shaft 198 and consequently rotation of the tapered roller member 196.

As best illustrated in FIGS. 2 and 3, mounted directly above the tapered roller member 196 is an elongated cylindrical, horizontally disposed shaft, generally designated by the numeral 236. The shaft 236 is provided with an axially extending slot or recess 238 along the upper side thereof (see FIG. 5), which slot 238 is communicable with the interior of the shaft 236 and is adapted to slidably receive a radially inwardly extending detent or tab portion 240 formed on an idler roller hub member, generally designated 242, with the result that the hub member 242 is adapted to slide longitudinally of the shaft 236 and rotation of the member 242 will effect simultaneous rotation of the shaft 236. The hub member 242 is adapted to rotatably support an idler roller 244 which includes a resilient outer peripheral portion that is preferably provided by means of a suitable O-ring or the like 246 mounted around the outer periphery of the roller 244. As best illustrated in FIG. 3, the shaft 236 is oriented such that the O-ring 246 of the roller 244 is peripherally engaged with the uppermost portion of the tapered roller member 196, whereby rotation of the roller 196 results in simultaneous rotation of the roller member 244 and shaft 236. As illustrated, the shaft 236 extends parallel to the upper side of the tapered roller member 196, whereby the idler roller 244 will be peripherally engaged with the roller 196 at any position to which the roller 244 is moved along the shaft 236.

Operatively connected to one end of the shaft 236 is a constituent counting mechanism, generally designated 248, which may be of any suitable construction and be proportioned in any desired number of units. By way of example, the counter mechanism 248 may be proportioned in units of 1000 and be of the type identified as a Durant of Veeder-Root counter. The mechanism 248 is provided with a central actuating shaft 250 that is adapted to be operatively connected to the adjacent end of the shaft 236, whereby rotation of the shaft 236 will effectuate proper actuation of the counter mechanism 248.

As shown in FIG. 4, the shaft 236 and counting mechanism 248 are mounted on a generally L-shaped mounting bracket, generally designated 252, which comprises a laterally extending section 254 that terminates at one end thereof in a forwardly extending leg section 256 having a central bore 258 within which one end of the shaft 236 is rotatably supported. The end of the bracket 252 opposite the section 256 is formed with a recessed portion 260 adapted to have a generally C-shaped support bracket 262 secured thereto by means of suitable screws, bolts or the like 264. The bracket 262 is adapted to operatively support the counting mechanism 248 on the mounting bracket 252, whereby the mechanism 248, shafts 236 and 250, and brackets 262 and 252 comprise a single unitized assembly.

The aforesaid unitized assembly is adapted to be pivotably mounted within the housing 68 in the position illustrated in FIGS. 3 and 4 by means of suitable pivot or hinge pins 266 and 268 that are adapted to pivotably interconnect a pair of rearwardly extending tab portions 270 and 272 formed on the rearward side of the bracket 252 to a pair of forwardly extending mounting flanges 274 and 275, respectively, that are formed on the forward side of the cover plate 30. In a preferred construction of the paint proportioning apparatus 10 of the present invention, the aforementioned assembly including the idler roller member 244, shafts 236, 250, brackets 262, 252, and counter mechanism 248, is spring biased downwardly toward the tapered roller member 196, with the result that the idler roller member 244 is resiliently urged into engagement with the periphery of the tapered roller member 196. By way of example, said assembly may be biased by means of a spring detent assembly 276, such as a Vlier detent comprising an external housing 277 which is threadably mounted within a suitable vertically extending bore 278 formed in the bearing block 118. It will be noted that the housing 277 may be vertically adjusted within the bore 278, and that the lower end of said housing 277 is adapted to engage the upper surface of the bracket 252 to positively limit upward pivotal movement thereof.

The shafts 236 and 250 are adapted to have their outer ends extend through lateral openings 279 and 280, respectively, formed in the laterally outer sides of the housing 68, as best illustrated in FIG. 3. The shafts 236 and 250 are provided with manually engageable knobs 282 and 284 adapted to be utilized in pivoting the assembly comprising the shafts 236, 250, brackets 252, 262, idler roller 244 and counter mechanism 248 about a pivotal axis defined by the pins 266 and 268. It will be noted that the openings 279 and 280 are somewhat larger in diameter than the size of the shafts 236 and 250 extending therethrough, whereby the knobs 282, 284 may be biased upwardly to raise the aforementioned assembly a predetermined amount. The purpose of the aforesaid construction is to permit the idler roller 244 to be raised upwardly out of peripheral engagement with the tapered roller member 196 and thereby permit the idler roller 244 to be longitudinally positioned along the shaft 236 without interfering with the roller 196, as will hereinafter be described.

It will be noted that the proportioning apparatus 10 may be provided with some type of auxiliary elevating or lifting mechanism (not shown) for selectively biasing the aforementioned assembly upwardly and maintaining it in an elevated position for any desired length of time, whereby the idler roller 244 may be positively disengaged from the roller member 196 independently of biasing the knobs 282, 284 upwardly in the manner hereinabove described. The provisions of such a mechanism will not only facilitate adjustment of the idler roller 244 axially of the tapered roller member 196, but will also find particularly useful application during periods of transporting and storing the apparatus 10 when it may be desirable to maintain the idler roller 244 disengaged from the roller member 196 to obviate the possibility of any "flats," impressions or other irregular indentations being formed in either of these members.

As best shown in FIGS. 1, 7 and 8, the wall portion 78 is formed with an elongated generally rectangular shaped access opening 286 below which an elongated scale 288 is mounted by means of suitable screws, bolts or the like 290. The scale 288 is adapted to be provided with suitable indicia, for example, "1 pint," "1 quart," "½ gallon," and "1 gallon" to be used in adjusting the position of the idler roller 244 along the tapered roller member 196. Alternatively, the scale 288 may be calibrated and marked to indicate metric or English linear measurements, i.e., centimeters, inches and fractions thereof, whereby to enable the operator to preset the total rise of the probe element 84 when the counter mechanism 248 turns from 000 to (1)000.

The wall portion 78 may be provided with an optional lens or transparent cover plate, best illustrated in FIG. 1 and generally designated by the number 292, which is adapted to be located directly in line with the numerical read-out section of the counting mechanism 248, thus enabling the operator to easily read the counting mechanism 248.

Means for laterally positioning the idler roller member 244 along the shaft 236 and for indicating the position of said roller member with respect to the indicia on the scale 288 is accomplished by means of a pointer and adjustment assembly best illustrated in FIGS. 7 and 8 and generally designated by the numeral 294. The assembly 294 comprises a generally V-shaped pointer member 296 which is adapted to overlie the scale 288 so as to be easily aligned with the indicia provided thereon. The pointer 296 is rigidly secured by means of suitable screws, bolts or the like to a generally Z-shaped member 300 that comprises a forwardly and upwardly projecting section 302 arranged at generally right angles with respect to the plane of the pointer 296. The inner end of the section 302 is integrally formed with an upwardly extending section 304 that extends parallel to the wall portion 78 directly interiorly of the access opening 286. The upper end of the section 304 is connected to a downwardly and rearwardly extending section 306 which is formed with a pair of downwardly directed leg portions 308 and 310 defining a laterally extending slot or recess 312 therebetween. The member 300 is adapted to be surmounted on the idler roller 244 such that the roller 244 is juxtapositioned between the leg portions 308 and 310, i.e., within the recess 312, as illustrated in FIG. 8. The sections 302 and 304 of the member 300 are adapted to be slidably carried along a generally downwardly and rearwardly inclined shoulder 314 defined by another generally Z-shaped support member 316 which is fixedly secured by means of suitable screws, bolts or the like 317 to the wall portion 78 directly below the access opening 286, the member 316 thereby providing a slideway for supporting the member 300 and pointer 296 for transverse sliding movement. In a preferred construction of the present invention, the support member 316 is fabricated of a plastic or similar easily molded or formed material. By virtue of the fact that the idler roller 244 is entrained within the slot 312 of the member 300, when said member 300 and pointer 296 are moved laterally of the apparatus 10, the idler roller 244 will be simultaneously biased axially of the shaft 236. Thus, when the pointer is moved along the opening 286 to a position aligned with certain indicia on the scale 288, the idler roller 244 will be biased to a preselected position along the tapered roller member 196. Means for thus laterally adjusting the member 300, pointer 296 and idler roller 244 is provided by an adjustment wheel or disk 318 which is rotatably mounted on the section 302 of the member 304 by means of a suitable pin or shaft 319, the outer periphery of the disk 318 extending through a central opening 320 in the section 304. The disk 318 is provided with a plurality of axially extending circumferentially spaced serrations 321 around the outer periphery thereof which are adapted to frictionally engage an upwardly and rearwardly extending section 322 of the member 316, as best seen in FIGS. 7 and 8.

As illustrated in FIG. 7, means in the form of one or more spring detent assemblies, generally designated 323, are provided for resiliently urging the disk 318 into peripheral engagement with the support member 316. Each assembly 323 comprises an external hollow cylindrical housing 324 which is threadably received within a suitable bore 325 in the member 300. The housing 324 contains a detent member 326 which is biased into engagement with the rearward side of the member 316 by a suitable coil spring or the like (not shown) located within the housing 324. It will be seen that the resilient force exerted against the rearward side of the member 316 by the assembly 323 positively engages the outer periphery of the disk 318 with the section 322 of the member 316, with the result that upon proper rotation of the disk 318, the pointer 296, member 300 and idler 244 will be moved laterally along the access opening 286 to any predetermined position.

In order to facilitate correlating the various component parts and assemblies of the paint proportioning apparatus 10 of the present invention, a brief description of an exemplary operational cycle thereof will now be given.

Initially, the receptacle 28 is placed upon the plate 24 in the manner illustrated in FIG. 1. This may be accomplished in either of two ways, the first of which is to actuate the clutch lever 52 in order to disengage the clutch plates 192 and 194, thereby permitting the support arm 82, probe element 84 and elevating shaft 114 to be raised upwardly so that the receptacle 28 may be placed upon the plate 24, at which time the aforesaid assemblage may be lowered, whereby the probe element 84 will be positioned interiorly of the receptacle 28. Alternatively, the locking member 92 may be rotated one revolution in order to disengage the threads 91 and 95 on the support arm 82 and member 92, respectively, whereby the probe element 84 and locking member 92 may be raised upwardly relative to the support arm 82 to a position wherein the receptacle 28 may be placed on the plate 24. Thereafter, the probe element 84 may be lowered downwardly into the receptacle and the locking member 92 may be rotated a single revolution to re-engage the threads 91 and 95. Assuming that the receptacle 28 is properly located on the plate 24 in the manner illustrated in FIG. 1, wherein the probe element 84 is inserted into the interior of the receptacle 28 with the toe 85 resting on the bottom of the receptacle 28, and further assuming that the counting mechanism 248 is adjusted so that the numerical indicating portion thereof reads zero, and that the pointer 296 is laterally adjusted to a position registering with the indicia on the scale 288 indicating the size or total volume of the receptacle 28, for example, 1 quart, or to the metric or English linear equivalent of the total liquid height, the crank 36 is initially rotated a predetermined amount, resulting in the crankshaft 32 and shafts 168, 220 and 224 rotating the tapered roller member 196 and idler roller 244. The crank is rotated until such time as the counting mechanism 248 reads the proportionate quantity of paint constituents which is to be added to the receptacle, at which time the probe element 84 will have been raised a predetermined amount by means of the transfer member 130 being elevated along the screw 144, as above described. The first liquid ingredient is then placed into receptacle 28 until the upper level thereof reaches the lower end of the toe 85, wherein the exact amount of paint ingredient will have been placed into the receptacle 28. The crank 36 is then rotated a predetermined amount so as to cause the next proportionate amount of paint color plus the previous proportionate amount to read on the counting mechanism 248, after which time the probe element 84 will be raised a corresponding amount and the second ingredient or colorant may be added to the receptacle 28. This process is continued until all of the colorants and ingredients have been placed into the receptacle 28 in their respective proportionate amounts. The probe element 84 is then raised in either of the two manners hereinbefore described, a sufficient amount to permit the filled receptacle to be removed and the new receptacle to be placed upon the plate 24. Preparatory to the next operational cycle, the pointer 296 will be properly positioned along the scale 288 in accordance with a particular size of the next receptacle being used, whereby the idler roller 244 will be simultaneously properly positioned along the tapered roller member 196. The clutch knob 52 may be then actuated to permit the entire assembly, including the probe element 84, support arm 82, shaft 114, ball screw mechanism 161 and transfer member 130, to be lowered solely under the influence of gravity, thereby obviating the need to crank the probe element 84 to its proper zero or reset position.

It will be seen from the foregoing description of the paint proportioning apparatus 10 that the relation and cooperation of the tapered roller member 196 and idler roller member 244 enables the apparatus 10 to be used in proportioning paints in all size cylindrical containers whose height does not exceed the range of the machine. This is accomplished since movement of the idler roller 244 along the tapered roller member 196 permits different amounts of movement of the probe element 84 for the same number of counter indications. Thus, some relatively small amount of movement of the probe element 84 can equal 1000 units on the counter mechanism 248, or, alternatively, a relatively larger amount of movement of the probe element 84 can equal 1000 units on the counter mechanism 248, the desired ratio of the rate of actuation of the counter mechanism 248 to the amount of vertical movement of the probe element 84 being preset by the lateral position of the idler roller 244 along the tapered roller member 196. Accordingly, the proportioning apparatus of the present invention will find universality of application, and thereby obviates the need for a plurality of different types of counter mechanisms to be used for different size receptacles. Moreover, by virtue of the low frictional characteristics of the ball screw mechanism 161, it is not necessary to manually reset the probe element 84 after it has been incrementally raised during the prior operational cycle. This construction, of course, minimizes to the extreme, the effort required to operate the paint proportioning apparatus 10. Additionally, the apparatus of the present invention may be used for different size receptacles in accordance with various measuring systems such as the imperial and metric measuring systems. It may be noted that the present invention may be modified by the provision of a pair of tapered roller members in the place of a single tapered roller member 196, with the advantage that the effective lengths of such pair of roller members could be approximately half the length of the roller member 196. Also, it will be readily apparent that the drive system. provided in the present invention by means of the crankshaft 32, crank 36 and plurality of various shafts 168, 220, etc., might be driven by means of a suitable drive motor or the like.

What is claimed is:

1. A paint proportioning apparatus comprising,
a base structure adapted to support a receptacle for receiving proportional quantities of paint constituents,
a vertically disposed probe element adapted to have the lower end thereof inserted within the receptacle,
elevating means for effecting vertical adjustable movement of said probe element,
counter means for indicating the amount of movement of said probe element,
operator means for actuating said elevating means and said counter means, and
means for selectively drivingly connecting said operator means with only said counter means or with both said counter means and said elevating means.

2. An apparatus as set forth in claim 1 which includes means for simultaneously actuating said counter means and said means for effecting vertical movement of said probe element.

3. An apparatus as set forth in claim 1 wherein said means for varying the ratio of movement of said probe element to the rate of actuation of said counter means comprises tapered roller means and means engageable with the periphery of said roller means for actuating said counter means.

4. An apparatus as set forth in claim 1 which includes tapered roller means, idler roller means peripherally engageable with said tapered roller means, and means operatively connecting one of said roller means with said counter means.

5. An apparatus as set forth in claim 4 which includes shaft means for drivingly connecting said idler roller means with said counter means, and wherein said tapered roller means is arranged wherein one edge portion thereof extends substantially parallel to said shaft means.

6. An apparatus as set forth in claim 1 which includes first and second roller means, one of said roller means being of substantially non-uniform diameter, and means for operatively moving one of said roller means axially of the other of said roller means.

7. An apparatus as set forth in claim 6 wherein said counter means is operatively connected to one of said roller means.

8. An apparatus as set forth in claim 1 wherein said means for varying the ratio of movement of said probe element to the rate of actuation of said counter means comprises a non-uniform diameter first roller member, an idler roller member, and means supporting said idler roller member for sliding movement axially of said first roller member wherein said idler roller member is peripherally engaged with said first roller member along the entire length thereof.

9. An apparatus as set forth in claim 8 which includes shaft means for rotatably and slidably supporting said idler roller member, said shaft means being arranged at a position substantially parallel to one edge portion of said first roller member.

10. An apparatus as set forth in claim 9 wherein said counter means is operatively connected to said shaft means.

11. An apparatus as set forth in claim 9 which includes drive means including a rotatable crankshaft, means drivingly connecting said crankshaft to said first roller member and said means for effecting said vertical movement of said probe element, whereby said probe element will move vertically within the receptacle and said first roller member will simultaneously rotate to effect rotation of said idler roller member and actuation of said counter means.

12. An apparatus as set forth in claim 10 wherein said shaft means is pivotably mounted adjacent said first roller member.

13. An apparatus as set forth in claim 8 which includes pointer means for providing a visual indication of the position of said idler roller member with respect to said first roller member.

14. An apparatus as set forth in claim 13 which includes indicia carrying means for orienting said pointer means at a preselected position with respect to said first roller member.

15. An apparatus as set forth in claim 11 which includes clutch means for operatively disconnecting said crankshaft from said means drivingly connecting said crankshaft to said first roller member and said means for effecting vertical movement of said probe element.

16. A paint proportioning apparatus comprising,
a base structure adapted to support a receptacle for receiving proportional quantities of paint constituents,
a vertically disposed probe element adapted to have the lower end thereof inserted within the receptacle,
means for effecting vertical adjustable movement of said probe element,
counter means for indicating the amount of movement of said probe element, means for continuously varying the ratio of movement of said probe element to the rate of actuation of said counter means, and drive means including a crankshaft for simultaneously actuating said counter means and said means for effecting vertical movement of said probe element, said drive means including means for effecting rotation of said crankshaft, a screw element for selectively raising and lowering said probe element, a roller element for selectively actuating said counter means, and clutch means for selectively drivingly connecting said crankshaft means with one of said elements.

17. An apparatus as set forth in claim 16 which includes a generally vertically disposed screw member, a transfer member threadably engaged with said screw member, and means drivingly connecting said screw member with said crankshaft means, whereby rotation of said crankshaft means results in rotation of said screw member and movement of said transfer member along said screw member.

18. An apparatus as set forth in claim 16 which includes a generally horizontally disposed support arm, and means for connecting said probe element to said support arm, whereby said probe element is vertically adjustable on said support arm.

19. An apparatus as set forth in claim 16 which includes tapered roller means, idler roller means peripherally engageable with said tapered roller means and means operatively connecting one of said roller means with said counter means.

20. An apparatus as set forth in claim 16 which includes first and second roller means, one of said roller means being of substantially non-uniform diameter, and means for operatively moving one of said roller means axially of the other of said roller means.

21. An apparatus as set forth in claim 19 which includes shaft means for rotatably and slidably supporting said idler roller member, said shaft means being arranged at a position substantially parallel to one edge portion of said tapered roller means.

22. A paint proportioning apparatus comprising, a base structure adapted to support a receptacle for receiving proportional quantities of paint constituents, a vertically disposed probe element adapted to have the lower end thereof inserted within the receptacle, and means for supporting said probe element for movement in a vertical direction, including elevating means and releasable clutch means for mechanically raising said element incrementally from a lower position to a substantially elevated position, release of said clutch means permitting said element to move toward said lower position under the weight of said element.

23. The invention as set forth in claim 22 which includes screw means for mechanically elevating said probe element to said substantially elevated position.

24. The invention as set forth in claim 23 wherein said screw means comprises a ball screw mechanism.

25. A paint proportioning apparatus comprising, a base structure adapted to support a receptacle for receiving proportional quantities of paint constituents, a vertically disposed probe element adapted to have the lower end thereof inserted within the receptacle, counter means for indicating the amount of movement of said probe element, means for supporting said probe element for movement in a vertical direction, including elevating means and releasable clutch means for mechanically raising said element incrementally from a lower position to a substantially elevated position, release of said clutch means permitting said element to move toward said lower position under the weight of said element.

26. A paint proportioning apparatus comprising, a base structure adapted to support a receptacle for receiving proportional quantities of paint constituents, a vertically disposed probe element adapted to have the lower end thereof inserted within the receptacle, means for supporting said probe element for movement in a vertical direction, including elevating means and releasable clutch means for mechanically raising said element incrementally from a lower position to a substantially elevated position, release of said clutch means permitting said element to move toward said lower position under the weight of said element.

References Cited

UNITED STATES PATENTS

| | | | |
|---|---|---|---|
| 958,061 | 5/1910 | Adams | 74—348 |
| 1,857,071 | 5/1932 | Tull | 33—142 |
| 2,326,111 | 8/1943 | Zachos | 33—126.75 |
| 2,476,674 | 7/1949 | McCauley | 33—126.75 |
| 2,650,414 | 9/1953 | Kreamer | 74—191 X |
| 2,685,135 | 8/1954 | Grubelic | 33—126.75 |
| 3,274,690 | 9/1966 | Beverly | 235—61 X |

WILLIAM D. MARTIN, JR., Primary Examiner

U.S. Cl. X.R.

235—61